(12) United States Patent
Lombois-Burger et al.

(10) Patent No.: US 10,040,726 B2
(45) Date of Patent: Aug. 7, 2018

(54) METHOD FOR PRODUCING AN INSULATING COMPOSITE BUILDING BLOCK

(71) Applicant: LAFARGE, Paris (FR)

(72) Inventors: Hélène Lombois-Burger, Saint Quentin Fallavier (FR); Cédric Roy, Saint Quentin Fallavier (FR); Christophe Levy, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 40 days.

(21) Appl. No.: 15/300,855

(22) PCT Filed: Apr. 2, 2015

(86) PCT No.: PCT/EP2015/057388
§ 371 (c)(1),
(2) Date: Sep. 30, 2016

(87) PCT Pub. No.: WO2015/150550
PCT Pub. Date: Oct. 8, 2015

(65) Prior Publication Data
US 2017/0022116 A1    Jan. 26, 2017

(30) Foreign Application Priority Data

Apr. 2, 2014    (FR) .................................... 14 52919

(51) Int. Cl.
| | | |
|---|---|---|
| *E04C 1/41* | (2006.01) |
| *C04B 38/10* | (2006.01) |
| *C04B 41/00* | (2006.01) |
| *B05D 7/22* | (2006.01) |
| *C04B 7/02* | (2006.01) |
| *C04B 7/147* | (2006.01) |
| *C04B 20/00* | (2006.01) |
| *C04B 111/40* | (2006.01) |
| *C04B 111/00* | (2006.01) |
| *C04B 111/10* | (2006.01) |
| *C04B 111/27* | (2006.01) |

(52) U.S. Cl.
CPC ................ *C04B 38/10* (2013.01); *B05D 7/22* (2013.01); *C04B 7/02* (2013.01); *C04B 7/147* (2013.01); *C04B 20/0024* (2013.01); *E04C 1/41* (2013.01); *B05D 2259/00* (2013.01); *C04B 2111/00215* (2013.01); *C04B 2111/00293* (2013.01); *C04B 2111/00482* (2013.01); *C04B 2111/00517* (2013.01); *C04B 2111/00663* (2013.01); *C04B 2111/00698* (2013.01); *C04B 2111/10* (2013.01); *C04B 2111/105* (2013.01); *C04B 2111/1043* (2013.01); *C04B 2111/27* (2013.01); *C04B 2111/40* (2013.01)

(58) Field of Classification Search
CPC ....... C04B 7/02; C04B 7/147; C04B 20/0024; C04B 38/10; C04B 2111/00215; C04B 2111/00663; C04B 2111/10; C04B 2111/105; C04B 2111/40; C04B 2111/27; C04B 2111/0698; C04B 2111/00517; C04B 2111/1043; C04B 2111/00293; C04B 2111/00482; E04C 1/41; B05D 7/22; B05D 2259/00
USPC .................................................. 427/230, 243
See application file for complete search history.

(56) References Cited

FOREIGN PATENT DOCUMENTS

| | | | |
|---|---|---|---|
| DE | 297 22 863 U1 | * | 12/1998 |
| DE | 10 2010 062 762 A1 | | 6/2012 |
| EP | 0 086 974 A1 | * | 8/1983 |
| EP | 1 174 558 A1 | | 1/2002 |
| FR | 2 374 393 A1 | | 7/1978 |
| FR | 2 943 082 A1 | | 9/2010 |
| WO | WO 2013/150148 A1 | | 10/2013 |

OTHER PUBLICATIONS

Preliminary Search Report as issued in French Patent Application No. 1452919, dated Dec. 8, 2014.
International Search Report as issued in International Patent Application No. PCT/EP2015/057388, dated Jun. 25, 2015.
Liapor: "New generation of products featuring mineral insulating material," Dec. 2013, Retrieved from the Internet: <http://www.liapor.com/en/fines.php?n=0102>, [retrieved on Oct. 22, 2014], XP002731482, 1 page.

* cited by examiner

*Primary Examiner* — William P Fletcher, III
(74) *Attorney, Agent, or Firm* — Pillsbury Winthrop Shaw Pittman LLP

(57) ABSTRACT

A method for producing a composite insulating mineral block, includes providing a mineral masonry block including at least one cell with walls having a water absorption rate of less than 5 g/(m²·s) at 10 minutes, and filling the cell with a mineral cement foam, wherein a cement used to produce the mineral cement foam has an aluminum oxide content of less than 20% by weight of the cement.

16 Claims, 1 Drawing Sheet

METHOD FOR PRODUCING AN INSULATING COMPOSITE BUILDING BLOCK

CROSS-REFERENCE TO RELATED APPLICATIONS

This application is the U.S. National Stage of International Application Serial No. PCT/EP2015/057388, filed Apr. 2, 2015, which in turn claims priority to French Application No. 1452919, filed Apr. 2, 2014. The contents of all of these applications are incorporated herein by reference in their entirety.

FIELD

The present invention concerns a method for producing a masonry element, or masonry block, in particular a composite insulating building block, and the element or block obtained with said method.

BACKGROUND

Individual building blocks are widely spread construction elements, the purchase of such material being most economical. However, the thermal insulating properties thereof remain limited. To improve their thermal properties concrete blocks can be made more lightweight by lightening the concrete. In addition, they can be moulded so as to comprise cells or internal voids to benefit from the insulating properties of air. In this case the cells must be of small size e.g. cells of elongate shape having a thickness of no more than 2 cm. Such blocks are difficult to manufacture however and use a large amount of raw material.

Insulating materials have been arranged inside the cells of blocks of lightweight concrete blocks to improve the heat resistance of these building blocks, thereby forming composite insulating blocks. It is known for example to insert mineral wool, glass wool or polystyrene inside breeze blocks of lightweight concrete. However, the manufacturing process is scarcely economical and/or complex. More recently, it has been proposed to fill the cells with cement foams since cement foams has thermal insulating properties of interest.

However, the filling of cavities contained inside blocks of lightweight concrete with cement foams requires quick-setting foam such as calcium aluminate cement foams. If slow-setting foams is used and inserted in foam form, the foam has a tendency to collapse, to become destabilised and to shrink when hardening and to detach from the cavity walls. Evidently, said phenomenon occurs to the detriment of the thermal properties of such composite blocks.

Quick-setting foams, in particular foams of calcium aluminate cement are economically of little interest and are difficult to use in an industrial process due to the very presence of these quick-setting properties (fouling phenomenon).

SUMMARY

It is the objective of the invention to overcome these disadvantages by providing a method for producing a composite, insulating mineral block, comprising the following steps:
a) providing a mineral masonry block comprising at least one cell having walls with a water absorption rate of less than 5 g/(m²·s) at 10 minutes, and
b) filling said cell with a mineral cement foam substantially not containing any calcium aluminate cement.

Preferably, the mineral cement foam comprises substantially no quick-setting cement. Preferably, the cell walls of the mineral building block can be a single wall (e.g. circular).

Advantageously, the method of the invention allows continuous or semi-continuous filling of the cells of the mineral masonry block with the mineral cement foam. This is particularly adapted to factory manufacture on a production line for continuous or semi-continuous production of the blocks.

Advantageously, with the method of the invention it is possible to preserve stability of the foam in the mineral masonry block i.e. the foam does not collapse.

Advantageously, the method of the invention allows complete filling of the block cell with little or no deformation on the surface of the foam, in particular little or no concave deformation.

Advantageously, with the method of the invention it is possible to obtain a composite insulating mineral block wherein the mineral cement foam has continued adhesion to the walls of the cell. This filling mineral foam does not become detached from the walls under usual conditions of use, even when the block is turned over and shaken. The method of the invention allows maintained cohesion of the block and foam. This means that the foam does not become destabilised.

BRIEF DESCRIPTION OF THE DRAWINGS

The invention will be better understood on reading the appended examples and Figures which are in no way limiting and in which.

DETAILED DESCRIPTION

Figure 1:
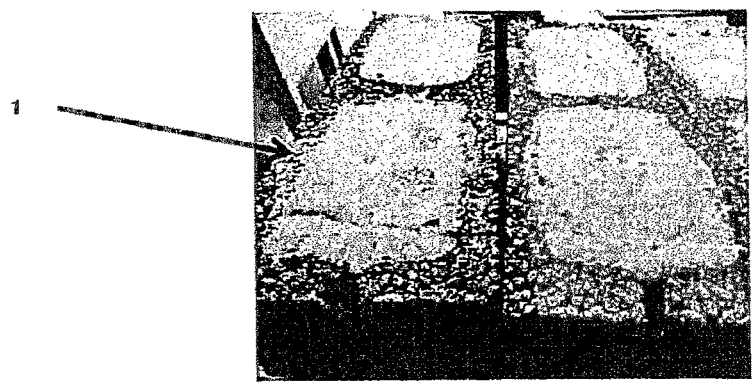
FIG. 1 illustrates concrete blocks filled with a cement foam according to the invention.

The expression "not substantially" designates a composition which does not include a sufficient amount of compound for the presence thereof to have any true effect on setting of the foam. Therefore, the presence of an amount less than about 5% by weight of the dry mixture, or traces of this compound, will not substantially affect setting of the foam and such amount may therefore be contained in the composition without this compound effectively being part of the composition.

Definitions

Cell: a hollow, cavity, empty space or excavation on the surface or inside the block. It is a structural void. This cell has walls intended to come into contact with the mineral cement foam.

Brick: a brick is a rectangular parallelepiped of raw clay earth, dried in the sun or baked in an oven and used as building material. The clay is often mixed with sand. The brick has one or more cells.

The term "composite" describes the association of a building block comprising one or more structural voids, preferably through voids, of which one and preferably all are filled with a mineral material having a structure or composition differing from that of said block.

Concrete: a mixture of cement with water, optionally aggregate and/or admixtures conforming with standard EN 934-2 of September 2002, and optional additions. The expression "concrete" indifferently designates a composition in the fresh or hardened state. The concrete can be a cement slurry, a mortar, concrete or lime grout. Preferably the concrete is a mortar or concrete.

Lightweight concrete: lightweight concretes are obtained by acting on the structure (cellular concrete) or on the use of lightweight aggregate (such as pumice stone aggregate, expanded shale beads, expanded clay or polystyrene, even particles of cork or wood). Admixtures such as air-entraining agents can also be added to obtain maximum light weight. It is also possible to create porosity by a reaction causing gas release: this is the case with cellular concrete or foamed concrete. The lightweight concretes of the blocks of the invention have much lower density than a conventional product, these densities ranging from to 300 to 1800 kg/m$^3$.

Cement: a cement is a hydraulic binder comprising a proportion of at least 50% by weight of calcium oxide (CaO) and silicon dioxide (SiO2). These amounts being determined by standard EN 196-2 of April 2006. The cements able to be used to produce either mineral foams or cell blocks can be selected from among the cements described in standard NF-EN197-1 of February 2001, in particular cements CEM I, CEM II, CEM III, CEM IV or CEM V. Advantageously the cement has a majority content of Portland cement such as CEM I.

The cements that are not suitable for the invention to produce the mineral foam are calcium aluminate cements or mixtures thereof. Calcium aluminate cements are cements generally comprising a mineralogical phase $C_4A_3\$$, CA, $C_{12}A_7$, $C_3A$ or $C_{11}A_7CaF_2$ or mixtures thereof, such as Ciments Fondu®, sulfoaluminate cements, calcium aluminate cements conforming with European standard NF EN 14647 of December 2006 for example. Said cements are characterized by an aluminium oxide content ($Al_2O_3$) greater than or equal to 35% by weight.

Therefore, to implement the method of the invention the aluminium oxide content of the dry mineral compound used to produce the foam is less than 35% by weight of the dry mineral compound. Preferably this content is less than or equal to 30%, advantageously less than or equal to 20%, more advantageously less than or equal to 15% and further advantageously less than or equal to 10% by weight of the dry compound.

Hydraulic binder: material which sets and hardens by hydration. Setting is the changeover from the liquid or paste state to the solid state. Setting is followed or accompanied by a hardening phenomenon whereby the material acquires mechanical properties. Hardening generally occurs on completion of setting, in particular for cement.

Slag: for example, such as defined by standard NF EN 197-1 of February 2001, paragraph 5.2.2, concerning a metallurgy co-product containing metal oxides, essentially silicates, aluminates and lime.

The expression "mineral foam" designates a complex medium mixture comprising a hydraulic binder, in particular cement, mixed with gas bubbles, generally air.

The expression "sufficiently wet" designates a sufficient degree of humidity to prevent shrinkage of the foam during hydration (i.e. setting) and drying. This degree of humidity may generally be that of concrete blocks in the fresh state on mould release. Alternatively, with regard to set and/or hardened blocks, this degree of humidity can be reached by adding water, in particular via immersion or sprinkling, until saturation of the block.

The expression "water repellent material" designates a material which adequately prevents transfer of an amount of water. For example, sufficient water repellence is obtained when a drop of water deposited on the surface of the material has a contact angle greater than 90°.

The mineral masonry block used at step a) of the method of the invention comprises at least one cell having walls with a water absorption rate of less than 5 g/(m$^2$·s) at 10 minutes, preferably less than 4 g/(m$^2$·s) at 10 minutes, more preferably less than 3 g/(m$^2$·s) at 10 minutes. In general, the water absorption rate is measured in accordance with standard NF EN 772-11 of August 2011.

The cell walls may also, in some cases, have an absorption rate that is practically zero or close to 0 g/(m$^2$·s) at 10 minutes. In this case the walls are either saturated with water and can no longer absorb water, or they are water-impermeable (e.g. by waterproofing). In both cases there is little or no water transfer via the wall.

Therefore, according to a first embodiment, the mineral masonry block used at step a) of the method of the invention may be in the fresh or sufficiently wet state. This block may contain a certain amount of water before the mineral cement foam is inserted in the cells. According to this embodiment, the mineral masonry block may be a block that is already formed and hardened, and will be made sufficiently wet or wetted. This wetting can be performed by adding water to this block e.g. by immersion, sprinkling or vaporisation. This block in the fresh or sufficiently wet or wetted state comprises at least one cell having walls with a water absorption rate of less than 5 g/(m$^2$·s) after 10 minutes, preferably less than 4 g/(m$^2$·s) after 10 minutes, more preferably less than 3 g/(m$^2$·s) after 10 minutes. In general, the water absorption rate is measured in accordance with standard NF EN 772-11 of August 2011.

Alternatively, the wetting may originate from non-drying after the block has been produced. If the block is obtained from the forming of an aqueous paste (e.g. containing clay (brick), lime or Portland cement), the mineral cement foam can advantageously be inserted into the cells before the block has set and/or hardened. This production method is most advantageous since it brings saving in time by combining the hardening and wetting steps and avoids additional handling steps of the blocks. Therefore, the method of the invention may advantageously comprise the use of a block in which the concrete is in the fresh state at step b), in particular a block of fresh lightweight concrete.

The mineral masonry block used at step a) of the method of the invention is preferably in the fresh state. This means that the material of the block is in the fresh state i.e. the block is neither set nor hardened. The block in the fresh state is generally a block that has just been formed or moulded. In this case, the forming and moulding of the block has just been completed and hydration of the cement is in progress.

For some types of blocks, the amount of water contained in just-formed blocks (blocks in the fresh state), is particularly suitable for the presence of mineral cement foam.

The use of non-hardened blocks i.e. freshly formed or in the progress of hydration and/or hardening, is a particularly innovative aspect of the invention. According to this particularly preferred aspect of the invention, the desired texture of the concrete is of wet clay type. It is difficult to characterize the rheology of said material using a simple test. Solely visual and touch aspects (forming in the hand of a ball that is not fully bound together) initially allow adequate evaluation of the formulation. Performing of the test allows verification of the quality of the formulation.

Therefore, according to one embodiment and a particularly preferred aspect of the invention, the production method comprises a step to form the block (e.g. a moulding step). This block-forming step is a variant of step a) and can be followed either immediately or after a short lapse of time by step b) to fill the cell or cells of the block. It is preferable that this lapse of time should not exceed 60 minutes, preferably 30 minutes and it is advantageously less than 10 min e.g. about 5 min.

Preferably, the time lapse between steps a) and b) in the method of the invention does not exceed 60 minutes, preferably 30 minutes and is advantageously less than 10 minutes, e.g. about 5 minutes.

After step b) of the method of the invention, the composite blocks are generally placed in premises, optionally with frost protection, this step being called a self-curing step. They are subsequently stored until marketing.

On the other hand, the method of the invention does not comprise a heat treatment step of the composite insulating block, aside from the self-curing step, nor any hydrothermal treatment, nor any autoclave treatment with or without pressurisation, at any time throughout the method.

Preferably, the production method of the invention does not comprise a drying step or baking step before steps a) or b).

Preferably, the production method of the invention is a continuous or semi-continuous method.

According to a second embodiment, the wall of the cells of the mineral masonry block is coated with a water repellent material which, in particular by blocking the pores, allows little or no water transfer.

It is possible to use surface water repellent compounds employed as surface coatings or bulk water repellents incorporated in the concrete at the time of block manufacture.

The water repellent compound able to be used either alone or in a mixture to waterproof a concrete or block is advantageously selected from the group consisting of the following compounds:

Silicon derivatives such as: polymethyl hydrogen siloxanes, polydimethyl siloxanes, organosiliconates (such as potassium or sodium methyl siliconate and in general alkylsiliconates), organosilanes (such octyl trimethoxysilane, octyl trethoxysilane, butyl trimethoxysilane, butyl triethoxysilane and straight-chain or branched C1 to C12 alkyl chain alkoxysilanes, organosilanols, alkyltrichlorosilanes and fluorinated silicones;

Fluorinated derivatives such as polytrifluoroethylenes, polytetrafluoroethylenes, and fluorocarbon derivatives;

Natural or synthetic alkyl fatty chains such as straight-chain or branched paraffins, including polyethylenes or polypropylenes.

The derivatives of fatty acids such as stearates, oleates, palmitates, behenates and derivatives marketed by Guerbet (e.g. calcium stearates or calcium oleate).

The water repellent compound can therefore be used when mixing the concrete (added to the bulk) or as post-treatment on an already-formed block, by impregnation or application by spraying the surface of the block.

The water repellent compound may be in powder form or liquid form. The liquid forms may be homogeneous or they may be emulsions or dispersions.

Some of these compounds, such as the organosilanes are hydrolysed in the presence of cement and water to organosilanols which polymerise and covalently bond onto the concrete surfaces and aggregate making them hydrophobic. Polymethyl hydrogen siloxanes are also hydrolysed and polymerise in situ. Products such as fatty acid salts or polydimethylsiloxanes or paraffin are trapped in the porosities. They prevent water movement and render the substrate hydrophobic.

One preferred water repellent compound is CHRYSOFUGE® C, a product marketed by Chryso. CHRYSOFUGE® C is a concentrated bulk water repellent containing calcium stearate and its use is recommended for concretes for which the hydraulic binder comprises lime. With this compound it forms hydrophobic micelles which block the capillaries in the concrete.

Therefore, the method of the invention may advantageously comprise a step for applying a water repellent compound onto the cell walls of the block, for example by immersion or vaporisation, a preliminary step before filling step b).

Preferably, the mineral masonry block used at step a) of the method of the invention may comprise a water repellent compound mixed within the bulk of the block.

For example, if the block is a block of lightweight concrete, the method may comprise a step to obtain a block by mixing a hydraulic binder and aggregate and at least one water repellent compound, said step being a preliminary step before the filling step b).

Preferably, the mineral masonry block used at step a) of the method of the invention is a concrete block.

The block used in the method of the invention is preferably a concrete block comprising a cement, aggregates, advantageously of general parallelepiped shape. If a water repellent compound is used, the cement may also comprise a certain amount of slag e.g. 2 to 33% by weight of total cement weight.

The aggregates may generally be aggregates selected from the groups of 0/4, 0/6 and 4/6.3 mm aggregate or mixtures thereof.

According to one particularly preferred aspect of the invention, the mineral masonry block is a block of lightweight concrete. The lightweight aggregates of the lightweight concrete block may be pumice stone and advantageously pumice sand of size 0/6 mm. According to one aspect of the invention, the lightweight aggregates are not glass beads or expanded glass beads or any glass-based aggregate.

According to another aspect of the invention, the block can be formed from a clay-based aqueous paste, such as a brick.

The cells are generally cells or hollows of standard size for the manufacture of building blocks.

Advantageously, the masonry block of the invention may be a concrete block, a lightweight concrete block, a cellular concrete block or a brick.

Advantageously, the masonry block of the invention may be a concrete block.

Advantageously, the masonry block of the invention may be a block of lightweight concrete.

Most advantageously, the cell contained in the block used in the method of the invention is a through cell i.e. an opening passing through the block from side to side.

The mineral cement foam used at step b) of the method of the invention is preferably in the fresh state, this meaning that it has neither set and/nor hardened. The mineral cement foam in the fresh state is generally a just formed or just cast foam, in this case hydration of the cement foam is in progress.

Preferably, step b) is a filling step with the mineral cement foam in the fresh state into a cell of a block in the fresh state or sufficiently wet.

Preferably, the mineral cement foam used at step b) is in the fresh state and the mineral masonry block used at step a) is in the fresh state.

The mineral cement foam preferably has a density of less than 600 kg/m$^3$, preferably less than 500 kg/m$^3$, more preferably less than 400 kg/m$^3$. Preferably, the mineral foam has very low thermal conductivity. Reducing the thermal conductivity of building materials is highly desirable since it allows savings in heating energy or air-conditioning in homes or workplaces. Thermal conductivity (also known as lambda ($\lambda$)) is a physical magnitude characterizing the behaviour of materials at the time of heat transfer via conduction. Thermal conductivity represents the amount of heat transferred per unit surface area and per unit of time under a temperature gradient. In the international unit system, thermal conductivity is expressed in watts per meter-kelvin (W·m−1·K−1). Conventional or traditional concretes have a thermal conductivity of between 1.3 and 2.1 measured at 23° C. and 50% relative humidity. The mineral foam used at step b) of the method of the invention can be selected from among foams having thermal conductivity ranging from 0.03 to 0.1 W/m·K, preferably 0.03 to 0.06 W/m·K and more preferably 0.03 to 0.046 W/m·K.

Mineral foams produced from blowing agents are excluded from the method of the invention.

Mineral foams which expand in the cell of the masonry block are excluded from the method the invention.

One subject of the invention is also a composite insulating mineral block, and more particularly a masonry block, obtained with the method of the invention and the use thereof in the building sector.

A further subject of the invention is a composite insulating block comprising a block, said block comprising at least one cell having walls optionally formed of a substantially water repellent material, said cell being filled with mineral foam not containing any calcium aluminate cement.

Preferably, said foam does not comprise any quick-setting cement. According to one particularly advantageous aspect of the invention, the hardened mineral foam is stable i.e. it does not collapse and does not become detached from the walls. The block and the mineral foam may be such as defined previously with reference to the method of the invention.

A further subject of the invention is the use of a composite insulating mineral block such as described above, or obtained with the above-described method, for building and more particularly for masonry.

EXAMPLES

Forming of concrete blocks with cells.
A Standard Concrete was Obtained Using Following Formula F33:
Hydraulic Binders:
 4.952 Kg of cement of type CEM I, or Portland type cement, comprising more than 95% of clinker (conforming to standard NF EN 197-1) sold by Lafarge under the trade name Ciment 52.5R;
 2.476 Kg of limestone material (slag) sold under the trade name BL200 by Orgon, Omya group.
Aggregate:
 24.514 Kg of sand from Petite Craz quarry of ground particle size 0/4 mm (as per standard BS EN 13139) sold by Lafarge aggregates under the trade name 0/4C.
 29.962 Kg of gravel from Petite Craz quarry of ground particle size 4/6.3 mm (as per standard BS EN 13139) sold by Lafarge aggregate under the trade name 4/6.3C.

The amount of pre-wetting water was 2.179 kg and the amount of mixing water was 0.916 kg.
A Waterproofed Concrete was Obtained Using Following Formula F 34:
Hydraulic Binders:
 4.943 Kg of cement of CEM I type, or cement of Portland type, comprising more than 95% clinker (conforming to standard NF EN 197-1) sold by Lafarge under the trade name Ciment 52.5R;
 2.471 Kg of limestone material (slag) sold under the trade name BL200 by Orgon, Omya group.
Aggregates:
 24.468 Kg of sand from Petite Craz quarry of particle size 0/4 mm (conforming to standard BS EN 13139) sold by Lafarge aggregates under the trade name 0/4C.
 29.905 Kg of gravel from Petite Craz quarry of particle size 4/6.3 mm (conforming to standard BS EN 13139) sold by Lafarge aggregates under the trade name 4/6.3C.
 0.099 kg of water repelling agent CHRYSOFUGE® C produced by Chryso.

The amount of pre-wetting water was 2.175 kg and the amount of mixing water 1.038 kg.
A Standard Lightweight Concrete was Obtained Using Following Formula F41:
Hydraulic Binders:
 4.943 Kg of cement of CEM I type, or cement of Portland type, comprising more than 95% clinker (conforming to standard NF EN 197-1) sold by Lafarge under the trade name Ciment 52.5R.
Aggregates:
 39.377 Kg of pumice stone sand of particle size 0/6 mm sold by Lafarge aggregates under the trade name Ponce de lava GR3554.

The amount of mixing water was 2.701 kg.
Concrete Preparation:
The method to obtain the concrete in the examples below followed a standard protocol as follows:
 Loading the aggregates in the mixer.
 Homogenisation for 30 s.
 Adding pre-wetting water in 30 s (4% by weight of the aggregates).
 Mixing for 1 min.
 Leaving the mix to stand for 4 min (time needed to reach absorption equilibrium of the aggregates),
 Adding the binders.
 Mixing for 1 min.
 Adding the mixing water in 30 s.
 Mixing for 1 min 30 s.
 Collection.

Homogenisation and mixing were performed using a standard mixer having the following technical characteristics: vertical axis mixer with eccentric blades, rotating drum, Zylos brand.

For lightweight concrete, the preparation method in the example below was performed following a standard protocol as follows:
 Loading the aggregates and binders in a mixer.
 Mixing for 1 min.
 Adding the mixing water in 30 s.
 Mixing for 1 min 30 s.
 Collection.
Forming of Blocks
Once the concrete was prepared, blocks comprising two cells were produced by casting the concrete in moulds and compacting thereof using fixed vibrator presses (vibro-compaction) using known, usual methods. To form the blocks (slab of 4 blocks of 15×20×40 cm) the amount of material used was 15.6 Kg to obtain blocks weighing about 14 Kg.

Production and Application of the Mineral Foam Using the Method Described in Document WO2013/150148A1

The cement slurry was produced in a mixer of Rayneri type. The mixing protocol was as follows. The mineral foam was produced from a mixture of a cement slurry and aqueous foam that were continuously homogenised in a static mixer. This mineral foam may be of the same type as those described on pages 23 to 26 of the patent application published under number WO2013/150148A1 filed by the applicant (mineral foams 6 to 8).

To summarise, a "cement slurry" was obtained using a solid compound, or premix, comprising one or more hydraulic binders (e.g. Portland cement and/or slag) in a proportion of 50% by weight of the dry mixture. Water was added to the premix to obtain a cement slurry in proportions of about 20%±5% by weight.

| Time | Speed | Action |
|---|---|---|
| 0 to 10" | Slow | Dry mixing of binders |
| 10" to 1'00 | Slow | Adding solution until formation of thickened portions |
| 1'00 to 2'00 | Fast | Mixing the thickened portions |
| 2'00 to 3'00 | Slow | Adding the remainder of the solution |
| 3' to 5'30" | Semi-fast | Mixing |

A Rayneri Turbotest Mixer (MEXP-101) comprising deflocculating blades and speed varying from 1000 rpm to 400 rpm depending on the slurry volume, was used to hold the slurry under continuous agitation in the storage vessel after production thereof and before being pumped for injection into the static mixer.

The slurry can be pumped using a volumetric pump of Moineau type e.g. an eccentric screw Seepex™ BN025-12-W pump, commission number 244921.

The aqueous foam was obtained by foaming a solution of water and foaming agent such as Proprump 26 produced by Propump. Propump 26 is an animal protein having a molecular weight of about 6000 Daltons. The amount of water may vary from 75 to 98% by weight, e.g. in the region of 80%.

Other additives such as a thickening agent (e.g. Kelco-crete 200 biopolymer), or an accelerator such as calcium chloride can be added but are generally not required.

The aqueous solution of foaming agent was co-added with pressurised air to the foamer (range of 1 to 6 bars) by means of a T-junction. The aqueous foam was continuously generated. The foamer was formed of a bed of glass beads of SB30 type having a diameter of between 0.8 and 1.4 mm, packed in a tube of length 100 mm and diameter 12 mm.

The cement slurry was contacted with the aqueous foam already placed in circulation within the circuit and the foamed cement slurry was thus obtained.

Filling of the cells of the concrete block with the foamed slurry was performed continuously via a hose moved from one cell to another. Although operation was manual in this example, it can be automated, in particular since the cement slurry does not contain any setting accelerator such as calcium aluminate.

Example 1: Filling of a Mineral Masonry Block in the Fresh State

Figure 2:
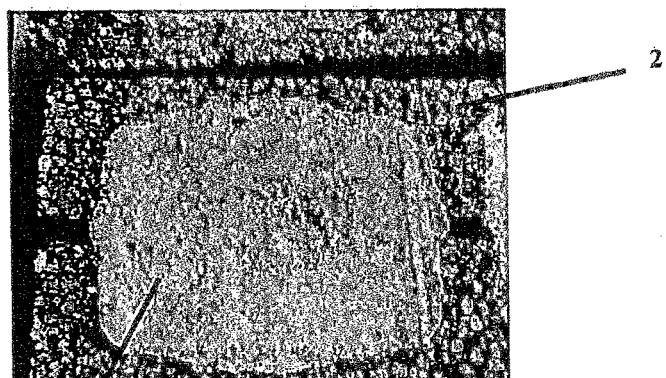
FIG. 2 illustrates part of the concrete block in FIG. 1 after drying.

According to a first variant of the invention, the cells of cement blocks (2) prepared in accordance with the above-described method with the Formula F33 concrete, were filled with cement foam (3) immediately after removal of said block (2) from the press (vibro-compactor) and mould release. The walls of the block cell were saturated with water (the theoretical water absorption value according to standard NF-EN 772-11 would be close to zero at 10 min in g/(m²·s) if cohesion of the block allowed such measurement. After filling with the cement foam, the composite insulating mineral blocks (1) were placed under a Styrodur© cover and left in place in situ for 24 hours. The outer appearance of these composite insulating mineral blocks (1) is illustrated in FIGS. 1 and 2.

This process was repeated with a block of lightweight cement of formula F 41.

Example 2: Filling of a Waterproofed Mineral Masonry Block

According to a second variant of the invention, cement blocks prepared following the above-described method using concrete of Formula F34 (waterproofed blocks) were placed under a Styrodur© cover to reproduce the curing conditions generally observed in manufacturing units of masonry blocks. The temperature was close to 30° C. and humidity close to saturation. After setting and curing (at least 24 hours) the cells of these blocks, having walls with water absorption in accordance with standard NF-EN 772-11 of 0.6 g/(m²·s) at 10 min, were filled with mineral cement foam. These composite insulating mineral blocks were placed under a Styrodur© cover and left in place in situ for 24 hours.

Example 3: Filling of a Mineral Masonry Block in the Rehydrated Dry State

According to a third variant of the invention, cement blocks prepared according to the method described above using Formula F33 concrete (non-waterproofed blocks) were placed under a Styrodur© cover for 48 hours to reproduce the curing and setting conditions generally observed in manufacturing units of masonry blocks. The temperature was close to 30° C. and humidity close to saturation.

After setting and curing, the block was re-wetted by sprinkling with large quantities of water for 20 seconds. The water absorption of the cell walls of the block (in accordance with standard NF-EN 772-11) was 2 g/(m²·s) at 10 min.

The cells of these blocks were then filled with cement foam. These composite blocks were placed under a Styrodur© cover and left in place in situ for 24 hours.

Example 4: Comparative Example: Filling of a Commercial Cement Block

Figure 3:
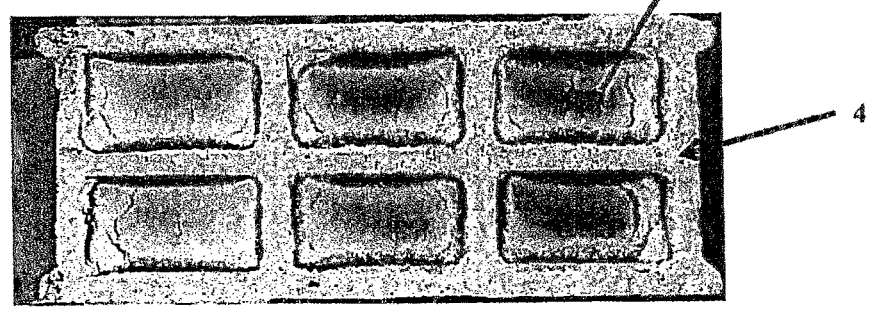
FIG. 3 is a comparative example of a concrete block when the method of the invention is not applied.

A breeze block in standard cement produced by Fabemi was filled with a cement foam (5). The outer appearance of this composite block (4) after drying is illustrated in FIG. 3. The water absorption of the cell walls of the block (in accordance with standard NF-EN 772-11) was 6 g/(m²·s) at 10 min.

CONCLUSION

The cement foam of the composite blocks obtained following the above-described method of the invention remained stable after drying. Not only did the foam remain attached to the walls from a visual viewpoint with no apparent shrinkage, but said blocks were able to be turned over to ensure that the foam remained attached to the walls. The foam did not become detached.

The cement foam inserted in the cells of a standard cement block (comparative Example 4) retracted and became detached from the cell walls.

Example 5: Example: Filling of a Commercial Mineral Masonry Concrete Block

Standard concrete blocks (breeze blocks produced by Fabemi) were filled with a cement foam. Three blocks were immersed in water for 24 hours and left to drain for 2 hours, 24 hours or 30 minutes. One block was not immersed (comparative block). Water absorption of the cell walls of the blocks, according to standard NF-EN 772-11, was variable as indicated in Table 1. They were then filled with cement foam. The state of the foam is described in Table 1 below.

TABLE 1

|  | Water absorption at 10 min in g/($m^2 \cdot s$) | Foam adhesion to block | Foam collapse | Foam cracking |
| --- | --- | --- | --- | --- |
| Without immersion (comparative example) | 5.9 | poor | 1.5 cm | moderate |
| 24 h draining | 4.1 | moderate | 0.5 cm | none |
| 2 h draining | 2.1 | good | 0.4 cm | none |
| 30 min draining | 1.3 | good | 0.3 cm | none |

Example 6: Example: Filling of a Commercial Lightweight Concrete Mineral Masonry Block Lightweight concrete blocks containing pumice stone aggregate (sold under the trade name Fabtherm by Fabemi) were filled with a cement foam (5). Three blocks were immersed in water for 24 hours and drained for either 2 hours, 24 hours or 30 minutes. One block was not immersed (comparative block). Water absorption of the cell walls of the blocks, according to standard NF-EN 772-11, were variable as indicated in Table 2. They were then filled with cement foam. The state of the foam is described in Table 2 below.

|  | Water absorption at 10 min in g/($m^2 \cdot s$) | Foam adhesion to block | Foam collapse | Foam cracking |
| --- | --- | --- | --- | --- |
| Without immersion (comparative example) | 11.8 | poor | 1.1 cm | major |
| 24 h draining | 4.9 | moderate | 0.3 cm | none |
| 2 h draining | 2.5 | good | 0.1 cm | none |
| 30 min draining | 1.8 | good | 0.1 cm | none |

The invention is not limited to the embodiments presented, and other embodiments will be clearly apparent to persons skilled in the art. In particular, it is possible to accelerate the setting of the composite blocks once the cement foam has been inserted in the cells, using known methods such as heating.

The invention claimed is:

1. A method for producing a composite insulating mineral block, comprising the following steps:
    a) providing a mineral masonry block comprising at least one cell with walls having a water absorption rate of less than 5 g/($m^2 \cdot s$) at 10 minutes, and
    b) filling said cell with a mineral cement foam, wherein a cement used to produce said mineral cement foam has an aluminium oxide content of less than 20% by weight of the cement.

2. The method according to claim 1, wherein the block used at step a) is in a fresh state or sufficiently wet.

3. The method according to claim 1, wherein the mineral cement foam does not comprise any quick-setting cement.

4. The method according to claim 1, wherein the mineral cement foam has a density of less than 600 kg/$m^3$.

5. The method according to claim 1, wherein the mineral cement foam used at step b) has thermal conductivity ranging from 0.03 to 0.06 W/m·K.

6. The method according to claim 1, wherein said cell is a through cell.

7. The method according to claim 1, wherein the block is a concrete block.

8. The method according to claim 1, wherein a time lapse between steps a) and b) does not exceed 60 minutes.

9. The method according to claim 8, wherein the time lapse between steps a) and b) does not exceed 30 minutes.

10. The method according to claim 1, further comprising a step for applying a water repellent compound to the cell walls of the block, a preliminary step before filling step b).

11. The method according claim 1, wherein the block used at step a) comprises a water repellent compound mixed in the bulk of the block.

12. The method according to claim 1, wherein the method is performed without carrying out a drying or oven baking step of the block before steps a) or b).

13. The method according to claim 1, wherein the method is a continuous or semi-continuous method.

14. A composite insulating mineral block obtained by the method according to claim 1.

15. A method comprising building a structure with a composite insulating mineral block according to claim 14.

16. The method according to claim 15, wherein the composite insulating mineral block is arranged in said structure by masonry.

* * * * *